United States Patent
Alalouni et al.

(10) Patent No.: US 11,625,853 B2
(45) Date of Patent: Apr. 11, 2023

(54) SPOT DETECTION ALGORITHM FOR EXTERNAL PIPELINE INSPECTION APPLICATIONS

(71) Applicant: SAUDI ARABIAN OIL COMPANY, Dhahran (SA)

(72) Inventors: Ahmed Alalouni, Ad Dammam (SA); Abubaker Saeed, Dhahran (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 180 days.

(21) Appl. No.: 17/227,913

(22) Filed: Apr. 12, 2021

(65) Prior Publication Data

US 2022/0327731 A1 Oct. 13, 2022

(51) Int. Cl.
*G06T 7/73* (2017.01)
*G06V 10/56* (2022.01)
(Continued)

(52) U.S. Cl.
CPC .............. *G06T 7/73* (2017.01); *G06T 7/0004* (2013.01); *G06V 10/30* (2022.01); *G06V 10/56* (2022.01);
(Continued)

(58) Field of Classification Search
CPC ..... G06T 7/73; G06T 7/0004; G06T 2200/24; G06T 2207/10024; G06T 2207/30136;
(Continued)

(56) References Cited

U.S. PATENT DOCUMENTS

2008/0004879 A1\* 1/2008 Huang .................. G10L 15/142
704/E15.028
2015/0213326 A1\* 7/2015 Utsumi .............. H04N 5/23229
348/223.1
(Continued)

FOREIGN PATENT DOCUMENTS

| CN | 109477786 A | 3/2019 |
|---|---|---|
| EP | 1344044 B1 | 7/2009 |
| GB | 2571405 A | 8/2019 |

OTHER PUBLICATIONS

Alalouni, Ahmed et al., "ROBO—Autonomous Football Robot", 2019 International Conference on Computational Intelligence and Knowledge Economy, IEEE, Dec. 2019 (6 pages).
(Continued)

*Primary Examiner* — Ali Bayat
(74) *Attorney, Agent, or Firm* — Osha Bergman Watanabe & Burton LLP

(57) ABSTRACT

There is disclosed a system for automatically detecting an irregularity on a pipe. The system includes a camera arranged at an external surface of the pipe, the camera being configured to capture a Red, Green and Blue (RBG) image of a region of a pipe. One or more hardware processors are in communication with the camera and are configured to: convert the RGB image to a modified image; split the modified image into a plurality of components; generate a binary image via performing a thresholding operation which utilizes the plurality of components; and detect the irregularity on the pipe via performing a feature extraction process on the binary image. Also disclosed and described is a related method.

20 Claims, 7 Drawing Sheets

(51) Int. Cl.
*G06V 10/30* (2022.01)
*G06V 20/00* (2022.01)
*G06T 7/00* (2017.01)
*G06F 3/04847* (2022.01)

(52) U.S. Cl.
CPC .......... *G06V 20/00* (2022.01); *G06F 3/04847* (2013.01); *G06T 2200/24* (2013.01); *G06T 2207/10024* (2013.01); *G06T 2207/30136* (2013.01)

(58) Field of Classification Search
CPC . G06T 2207/10004; G06T 7/11; G06T 7/136; G06T 7/155; G06V 10/30; G06V 10/56; G06V 20/00; G06F 3/04847
USPC .......................................................... 382/103
See application file for complete search history.

(56) References Cited

U.S. PATENT DOCUMENTS

| | | | |
|---|---|---|---|
| 2015/0286044 A1* | 10/2015 | Rout | G02B 27/0081 382/163 |
| 2018/0024031 A1 | 1/2018 | Von Drasek et al. | |
| 2018/0308235 A1* | 10/2018 | Yuan | A61B 1/000094 |
| 2019/0378621 A1* | 12/2019 | Ellison | G06F 3/011 |
| 2021/0394123 A1* | 12/2021 | Watanabe | G06T 7/0004 |
| 2022/0036541 A1* | 2/2022 | Gubbi Lakshminarasimha | G06T 7/168 |

OTHER PUBLICATIONS

Atha, Deegan J and Mohammad R Jahanshahi, "Evaluation of deep learning approaches based on convolutional neural networks for corrosion detection", Structural Health Monitoring, The Authors, 2017, pp. 1-19 (19 pages).

Bondada, Venkatasainath et al., "Detection and quantitative assessment of corrosion on pipelines through image analysis", Procedia Computer Science, ScienceDirect, Elsevier Ltd., vol. 133, Jul. 2018, pp. 804-811 (8 pages).

Gunatilake, Amal et al., "Real-Time 3D Profiling with RGB-D Mapping in Pipelines Using Stereo Camera Vision and Structured IR Laser Ring", 2019 14th IEEE Conference on Industrial Electronics and Applications, IEEE, 2019, pp. 916-921 (6 pages).

Hoang, Nhat-Duc and Van-Duc Tran, "Image Processing-Based Detection of Pipe Corrosion Using Texture Analysis and Metaheuristic-Optimized Machine Learning Approach", Computational Intelligence and Neuroscience, Hindawi, vol. 2019, Article ID 8097213, pp. 1-13 (13 pages).

Khan, Amjad et al., "Subsea Pipeline Corrosion Estimation by Restoring and Enhancing Degraded Underwater Images", IEEE Access, IEEE, vol. 6, Jul. 2018, pp. 40585-40601 (17 pages).

Matas, J. et al., "Robust Detection of Lines Using the Progressive Probabilistic Hough Transform", Computer Vision and Image Understanding, Academic Press, vol. 78, 2000, pp. 119-137 (19 pages).

Yuen, H.K. et al., "A Comparative Study of Hough Transform Methods for Circle Finding", Alvey Vision Conference, Aug. 1989, pp. 169-174 (6 pages).

* cited by examiner

SPOT DETECTION ALGORITHM FOR EXTERNAL PIPELINE INSPECTION APPLICATIONS

BACKGROUND

The early detection of certain structural irregularities (e.g., corrosion, pinholes or scale formation) on portions of pipes or pipelines, such as production and flow line pipes in the oil and gas industries, can be critical in protecting transported assets and in safeguarding the environment. The monitoring and imaging of a pipe or pipeline, e.g., with the aid of an electronic camera or other imaging device, clearly overcomes inefficiencies inherent in purely visual (human eye) inspections. However, the accurate pinpointing and classification of relevant irregularities has remained a steep challenge, especially when aiming to economize on resources for imaging and image processing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system for automatically detecting an irregularity on a pipe. The system includes a camera arranged at an external surface of the pipe, the camera being configured to capture a Red, Green and Blue (RBG) image of a region of a pipe. One or more hardware processors are in communication with the camera and are configured to: convert the RGB image to a modified image; split the modified image into a plurality of components; generate a binary image via performing a thresholding operation which utilizes the plurality of components; and detect the irregularity on the pipe via performing a feature extraction process on the binary image.

In one aspect, embodiments disclosed herein relate to a method which includes: receiving, via a computer processor, a Red, Green and Blue (RGB) image of a region of a pipe; converting, via the computer processor, the RGB image to a modified image; and splitting, via the computer processor, the modified image into a plurality of components. The method further includes: generating, via the computer processor, a binary image via performing a thresholding operation which utilizes the plurality of components; and detecting, via the computer processor, an irregularity on the pipe via performing a feature extraction process on the binary image.

In one aspect, embodiments disclosed herein relate to a non-transitory computer readable medium storing instructions executable by a computer processor, the instructions comprising functionality for: receiving an RGB ("Red, Green and Blue") image of a region of a pipe, at an external surface of the pipe; converting, via a computer processor, the RGB image to a modified image; splitting, via the computer processor, the modified image into a plurality of components; generating, via the computer processor, a binary image via performing a thresholding operation which utilizes the plurality of components; and detecting, via the computer processor, the irregularity on the pipe via performing a feature extraction process on the binary image.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
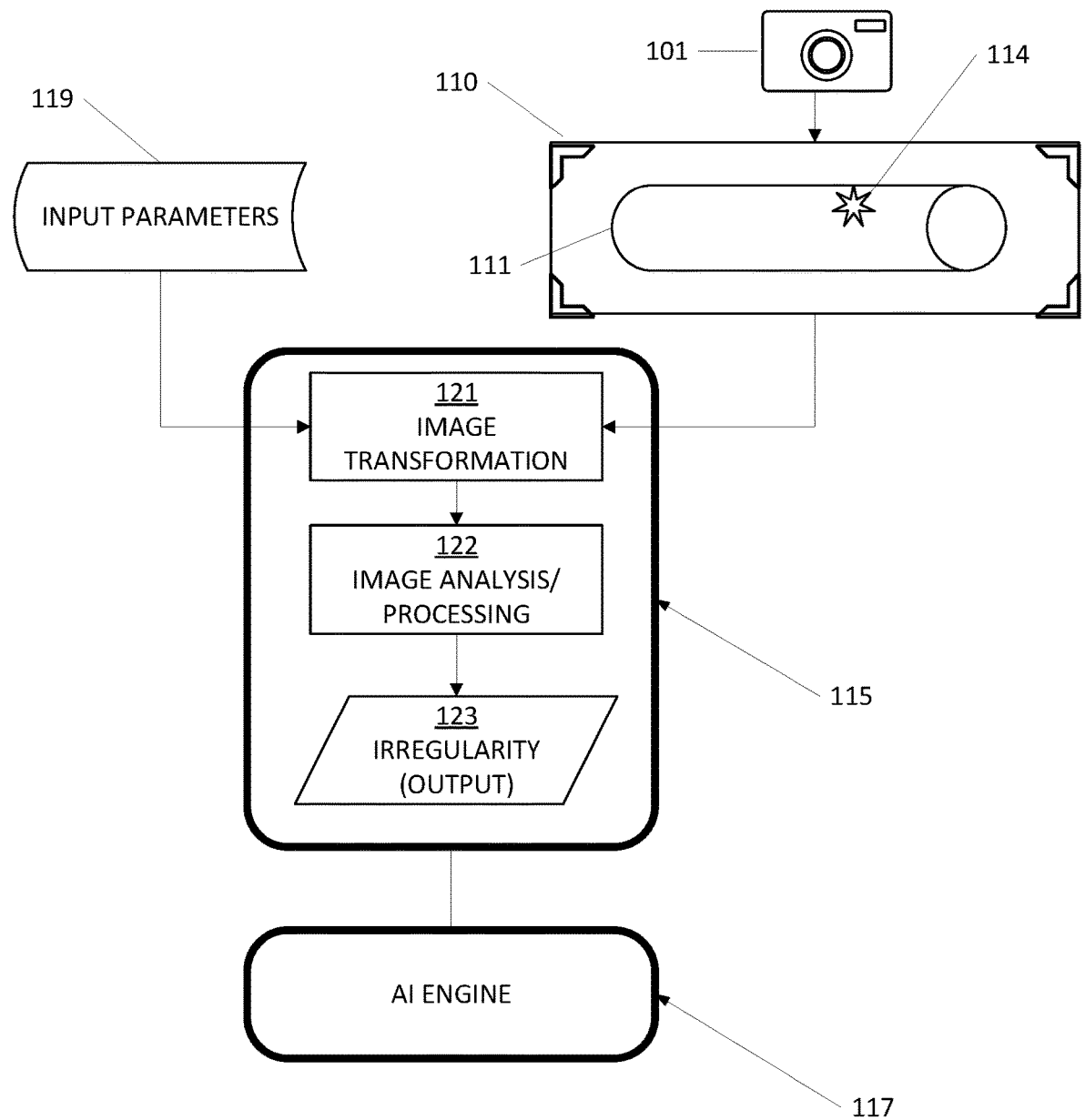
FIG. 1 schematically illustrates a system for automatically detecting an irregularity on a pipe, in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

By way of general introduction, one or more embodiments (as broadly described and contemplated herein) can encompass a process of detecting one or more irregularities (or "spots") on a pipe, via determining the existence and/or location of such irregularities via an image captured by a camera. The severity of a related condition can also be determined, and even quantified via a threshold algorithm for further image processing applications. For instance, just by way of example, the thickness of scale or the amount of metal loss in corrosion could be computed, as well as the severity of a leak spot.

Included among the very wide variety of possible commercial applications for one or more embodiments (as broadly described and contemplated herein) are: pinhole corrosion detection; clamp-on pipeline scanning; oil spill mitigation; oil leak detection; and corrosion and scale monitoring. Thus, by way of an illustrative example, a pinhole corrosion area (or spot) may represent one type of irregularity that can be detected. Such a corrosion area (or spot) can easily be aggravated over a period of time, resulting in damage that may result in a reduced fluid production rate within the pipe. If detected sufficiently early, proper action may then be readily undertaken to fix the damaged spot and prevent additional damage.

It can thereby be appreciated that, in a setting involving external (above-ground) pipelines traversing great distances (e.g., in the oil and gas industries), it is highly challenging to rely merely on manual (human) observation to adequately inspect corrosion conditions in a pipe. Accordingly, an automatic detection system and process, as broadly contemplated herein, can be employed to obviate the disadvantages and shortcomings inherent in purely manual inspection regimes. As will be appreciated herebelow, a great variety of implementations are conceivable, including the use of cameras mounted on Unmanned Aerial Vehicles (UAVs), to undertake inspection and aerial surveillance. Alternatively, an automatic detection system and process can be utilized by a human manual observer, e.g., via a portable computer or smartphone, to relieve physical demands on the observer him/herself.

Turning now to the figures, it should be noted that the flowchart and block diagrams therein illustrate the architecture, functionality, and operation of possible implementations of systems, apparatuses, methods and computer program products according to one or more embodiments. In this regard, each block in the flowchart or block diagrams may represent a segment, module, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Additionally, any block shown in a flowchart and/or block diagram may in instances be regarded as individually dispensable or interchangeable, thus not necessarily dependent on being included with one or more other blocks shown in the same diagram. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Figure 5:
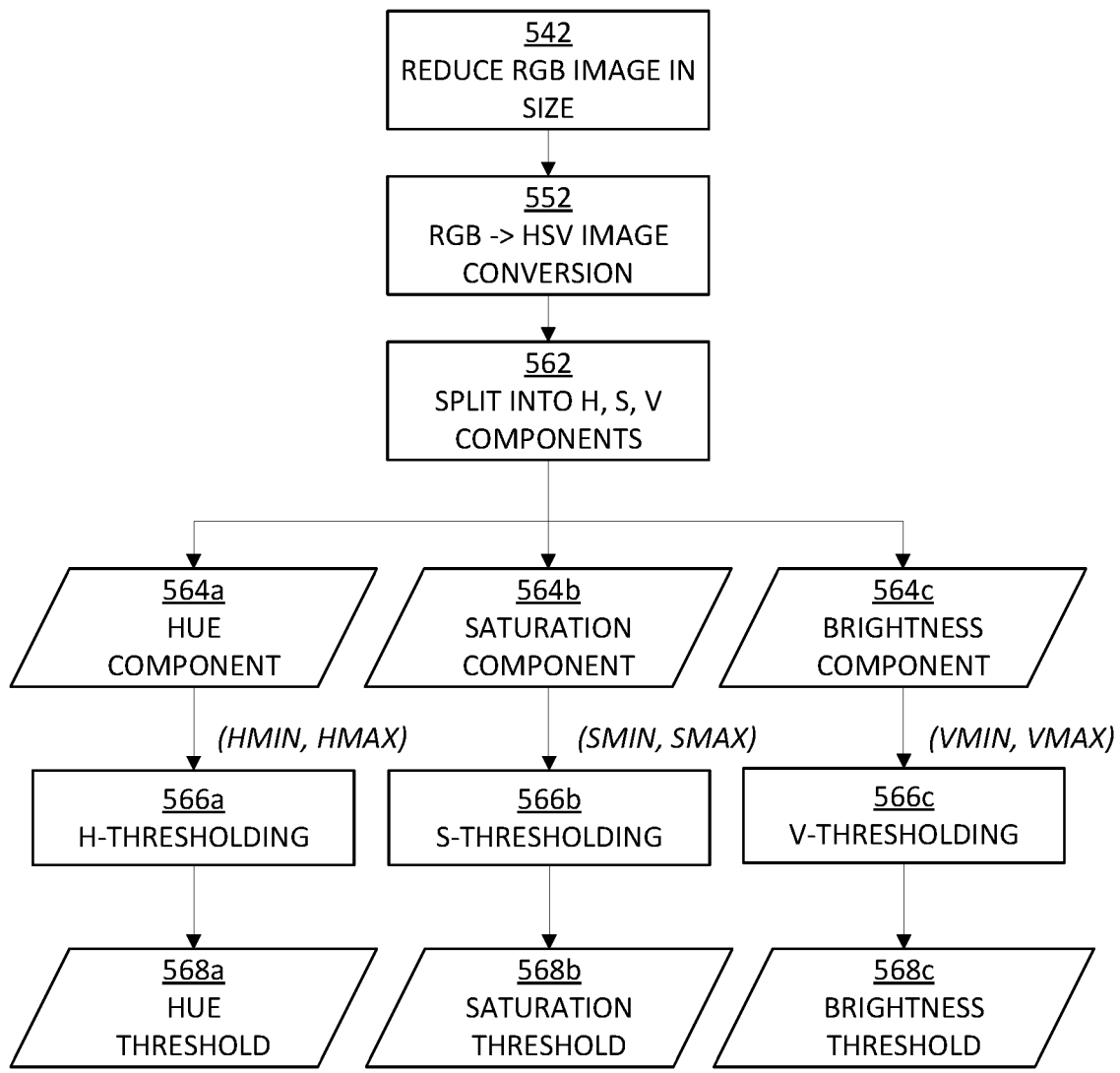
FIG. 5 shows a flowchart depicting a process of image conversion and splitting, in accordance with one or more embodiments.
Figure 6:
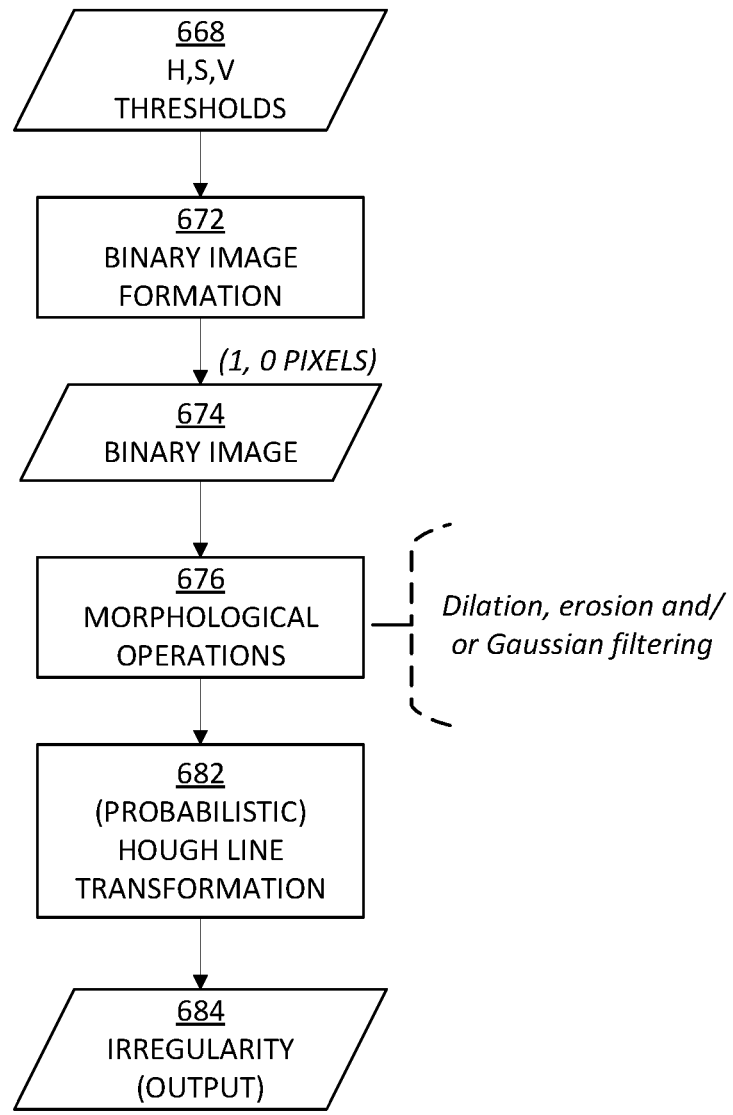
FIG. 6 shows a flowchart depicting processes of generating a binary image and performing feature extraction on a binary image, in accordance with one or more embodiments.
Figure 7:
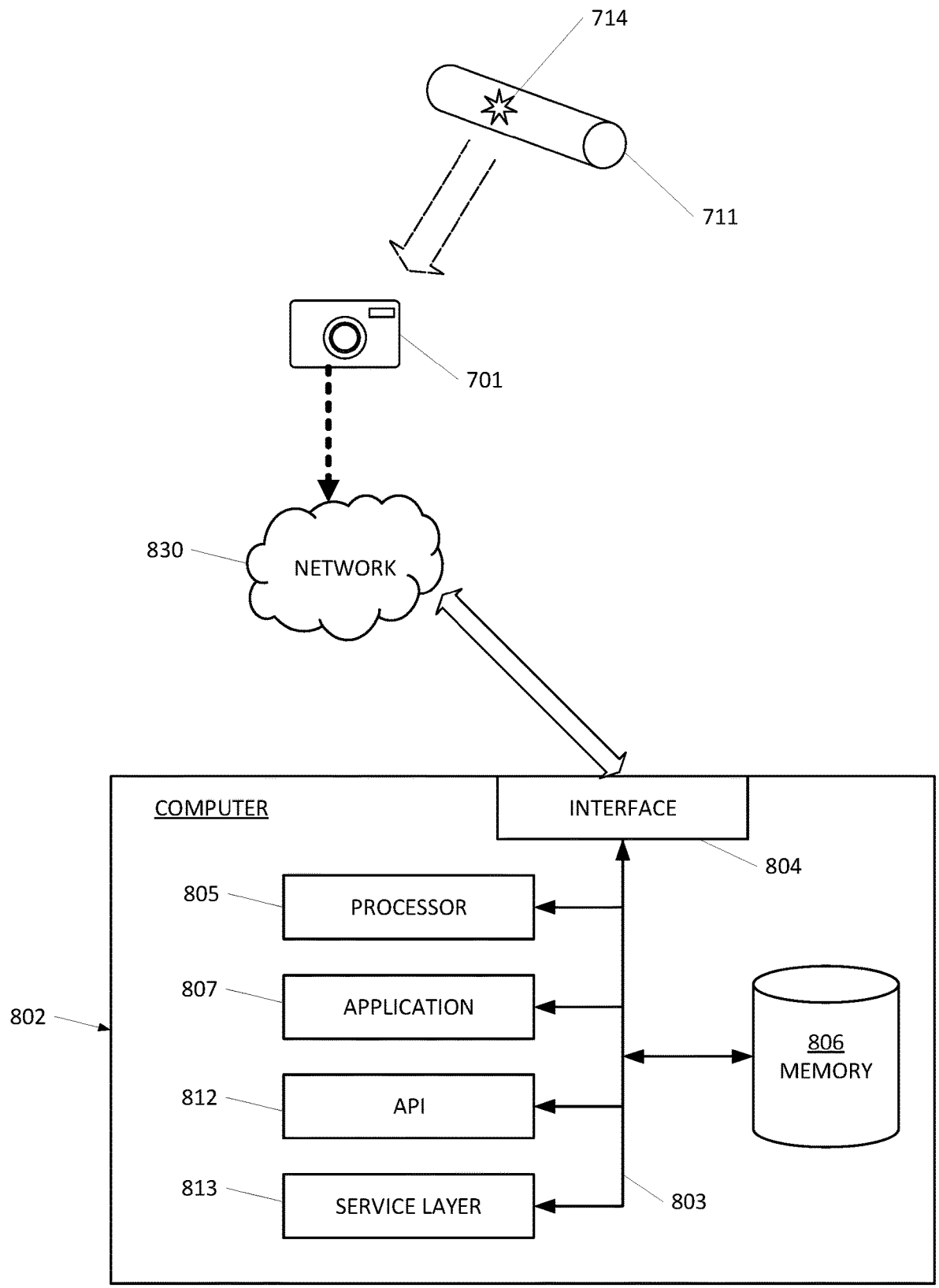
FIG. 7 schematically illustrates a computing device in accordance with one or more embodiments.

To facilitate easier reference, in advancing from FIG. 1 to and through FIG. 7, a reference numeral is advanced by a multiple of 100 in indicating a substantially similar or analogous component or element with respect to at least one component or element found in at least one earlier figure among FIGS. 1-7.

FIG. 1 schematically illustrates a system for automatically detecting an irregularity on a pipe (111), in accordance with one or more embodiments. FIG. 1 is presented at a very general level, while specific implementations and embodiments related thereto will be better appreciated from the discussion proceeding thereafter. As shown, a camera (101), or other imaging device, is configured to capture an image (110) of a region of a pipe (111). The pipe (111) may form part of an above-ground pipeline, e.g., as commonly employed in the oil and gas industries, but could also represent a pipe found in any of a great variety of other conceivable physical settings or operating contexts. The pipe (111) may include an irregularity (114) such as the buildup/development of scale, pitting corrosion, a pinhole or other irregularity. The image (110) may be a "Red, Green and Blue" (RGB) image, and may be input into an irregularity detection module (115). Further, image (110) may be embodied by a single still image that is captured, a series of single images captured over a given time frame, and/or a video that may be captured over a given time frame.

In one or more embodiments, the irregularity detection module (115) may be a computer application or other compilation of computer code, capable of executing steps of an algorithm for detecting an irregularity on a pipe in accordance with embodiments described and broadly contemplated herein. The irregularity detection module (115) may reside in one or more components of a computing device as described in FIG. 7 below and broadly understood herein and may be activated/executed by an artificial intelligence (AI) engine (117). As such, the AI engine (117) may include a plurality of machine learning algorithms (e.g., a supervised machine learning (ML) algorithm, a deep learning (DL) algorithm) and a processor configured to execute instructions stored in a non-transitory computer storage medium for guiding execution of steps of an algorithm of detecting an irregularity in a pipe as aforementioned (and as otherwise discussed and contemplated herein). The AI engine (117) is configured to train ML algorithms. For example, the AI engine (117) may assess a data set corresponding to the input parameters (119) and partition the data set into a training data set, a validation data set and a testing data set. The data from the data set may be used to train an ML algorithm to classify an image, convert the image, or detect an irregularity from the image.

In accordance with one or more embodiments, the irregularity detection module (115) is configured to receive input data (119) relating to one or more predetermined parameters as broadly contemplated herein, e.g., initial/default minimum and maximum parameters for hue, and/or saturation and brightness components of an HSV (hue, saturation and brightness) image. Such parameters may be understood as tailoring the process toward detecting a particular irregularity or type of irregularity, wherein an irregularity or type of irregularity may be understood as corresponding to a particular color or range of colors. Module (115) also is configured to undertake general steps of transforming the image (121), analyzing/processing the image (122) and providing output relating to a detected irregularity (123). To this end, module (115) may include software, hardware, firmware or a combination thereof to transform and process the image (110), as activated, guided and/or executed by the AI engine (117). In one or more embodiments, the algorithm executed by module (115), beyond detecting irregularities, may also be used to determine the severity of a condition of a region of the pipe (111), and to quantify the condition.

Camera (101), for its part, may be any suitable digital camera arranged at (e.g., positioned at or near, and/or pointed towards) an external surface of the pipe (111) and is configured to capture an RGB image (110) of a region of the pipe. Such a camera (101) may be a built-in component of a personal computer, laptop or tablet, or a built-in component of a smartphone. The camera (101) may alternatively be a stand-alone device capable of storing RGB images and/or communicating captured images to a computer disposed elsewhere or may be attached to (or an inherent component of) a transportable entity such as a drone, UAV or even a ground-based vehicle such as a car or truck (which itself may be fully or partly autonomous).

Figure 2:
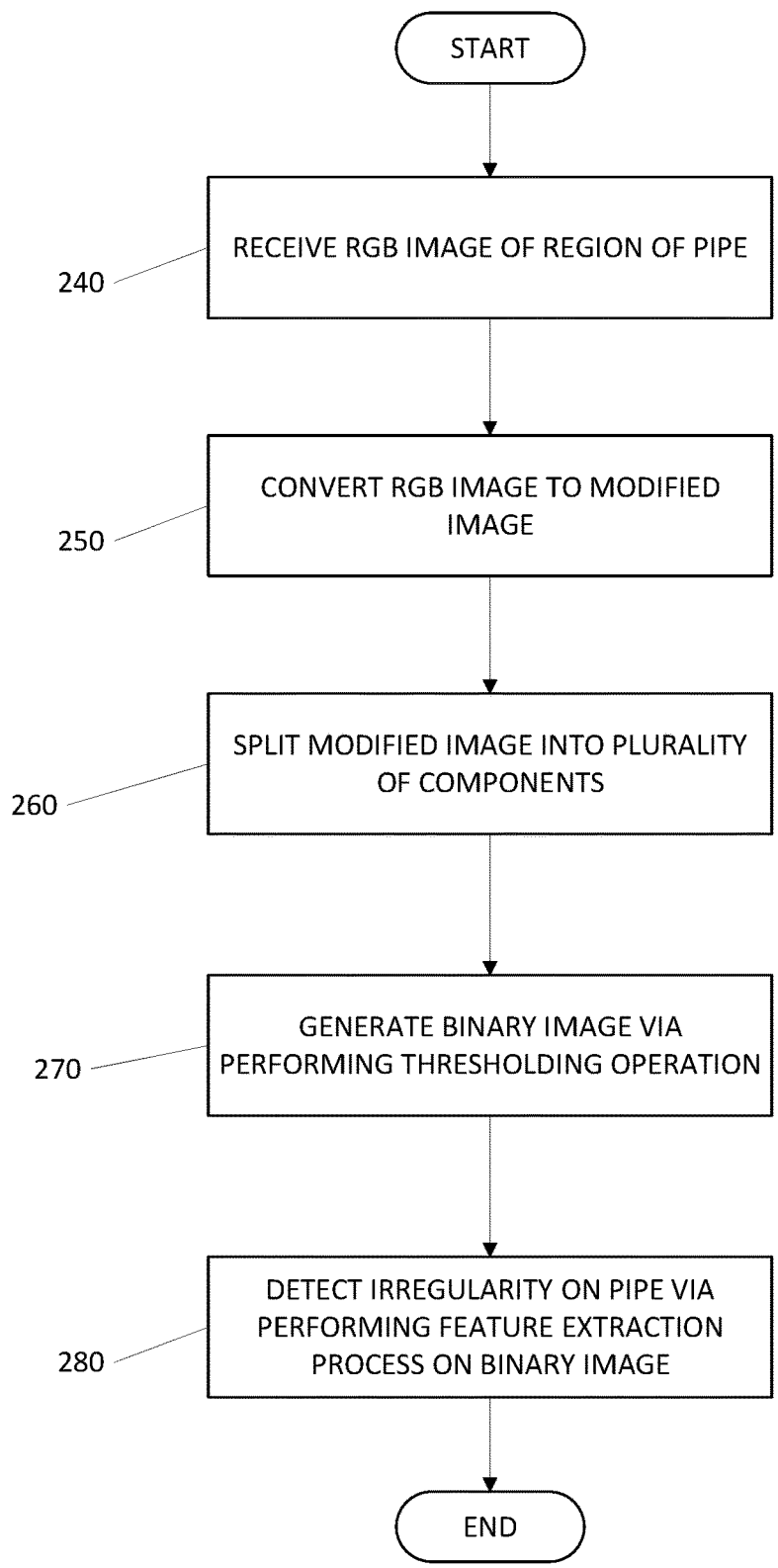
FIG. 2 shows a flowchart depicting a process in accordance with one or more embodiments.

FIG. 2 is a flowchart depicting a process in accordance with one or more embodiments. Initially, an RGB image of a region of pipe is first received (240). More specifically, the RGB image may be received at an image transformation component of an irregularity detection module (121 and 115 in FIG. 1, respectively) as discussed heretofore, or via any suitable input medium of a processor capable of analyzing and processing this initial image. Then, the RGB image is converted to a modified image (250). In accordance with one or more embodiments, the modified image differs from the original RGB image in being defined by a color space that is more intuitive and perceptually relevant for further analysis and (natural or artificial) visualization. By way of an example discussed herein, the modified image may be defined by the HSV (hue, saturation, brightness) color space. Conversion may occur via an image transformation component (e.g., 121 in FIG. 1) as discussed heretofore and as otherwise expanded on herebelow. The modified image is then split into a plurality of components (260). The splitting may occur via an image transformation component (e.g., 121 in FIG. 1) as discussed heretofore, and these components may be relevant to the different (non-RGB) color space just discussed. By way of an example discussed herein, the components may be hue, saturation and brightness components of an HSV image.

At this stage, in accordance with one or more embodiments, a binary image may be generated by performing a thresholding operation (270). A thresholding operation may be undertaken, e.g., by an image analysis/processing component as discussed heretofore (e.g., 122 in FIG. 1). This step can involve, by way of an example discussed herein, thresholding applied individually to each of the components into which a modified image has been split, e.g., hue, saturation and brightness components of an HSV image. Using the results of Steps 240-270, an irregularity on the pipe can then be detected by performing a feature extraction process on the binary image (280). The feature extraction process may be undertaken, e.g., by an image analysis/processing component as discussed heretofore (e.g., 122 in FIG. 1) which then provides output related to a detected irregularity (e.g., see 123 in FIG. 1). By way of an example discussed herein, this step can involve morphological operations and a Hough line transformation performed on the binary image. Various possible refinements within the scope of the process shown in FIG. 2, and as broadly contemplated herein, will now be appreciated from the ensuing discussion.

Generally, in accordance with one or more embodiments, a process as broadly contemplated herein is employed in the automated inspection of an external pipe (or pipeline). Such applications can include, but by no means are limited to, the monitoring of scale buildup, detection and location of oil spills, and pinhole corrosion.

As such, in a process in accordance with one or more embodiments, suitable code for different functions may be developed or refined by a user, or may be sourced, e.g., from one or more open-source libraries. As such, a user may advantageously employ one or more functions or capabilities on a piecemeal or comprehensive basis, as already afforded by such libraries. By way of an illustrative and non-restrictive example, the open-source libraries "OpenCV" and "NumPy" may be selectively employed in any or all steps of a process as may be deemed suitable; several illustrative and non-restrictive working examples, indeed, are provided in the ensuing discussion. The OpenCV library is cross-platform and free for use under the open-source "Apache 2" license, and NumPy is a library for the "Python" programming language. OpenCV includes several functions that are useful in computer vision applications, while NumPy includes several functions that are generally useful in scientific computing applications (e.g., to extract, from an image, an irregularity that may be detectable at an external surface of a pipe).

Figure 3:
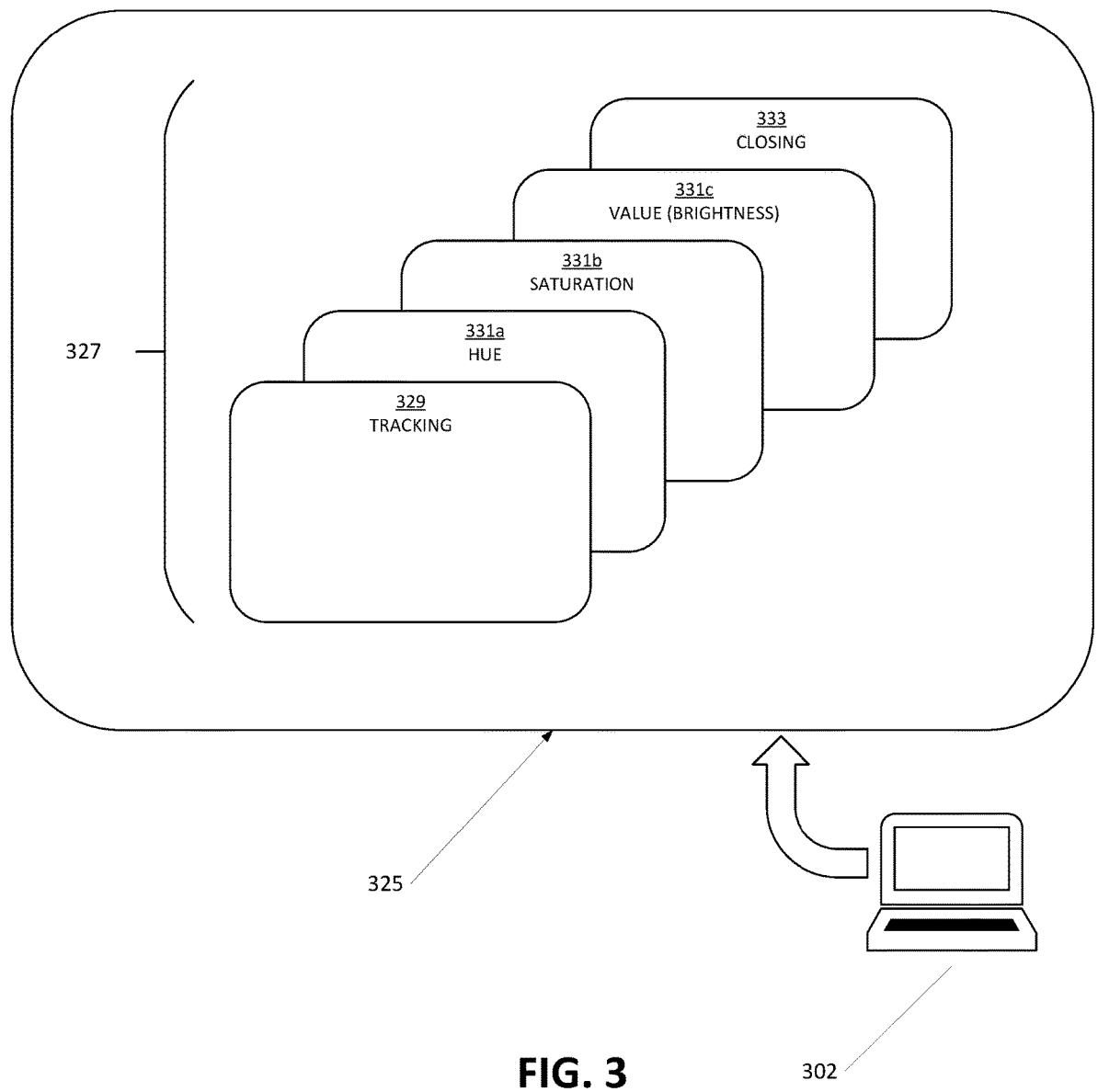
FIG. 3 schematically illustrates a graphical user interface (GUI) with several windows, in accordance with one or more embodiments.

FIG. 3 schematically illustrates a graphical user interface (GUI) (325) of a computing device (302), in accordance with one or more embodiments. As such, at an initial stage of a process for automatically detecting an irregularity on a pipe, several windows (327) are created on the GUI (325) for subsequent use and may include windows for: a tracking image (329); hue (331a), saturation (331b) and brightness (331c) images (relative to an HSV image as discussed herein, and as expanded upon herebelow), and for a closing image (333). For example, to create the windows, the OpenCV function namedWindow( ) may be invoked. The tracking image window (329) may show an originally captured image (e.g., a single image captured on a one-time basis, an image taken from a series of captured images, and/or an image taken from a captured video). The closing image window (333) may show an image representing a final result of the process. Though not shown in FIG. 3, a window with trackbars may also be included within GUI (325), as will be better understood below with reference to FIG. 4.

In accordance with one or more embodiments, the five windows (329, 331a, 331b, 331c and 333) may be created after an RGB image is received (e.g., see 240 in FIG. 2) but before other steps of a general process for automatically detecting an irregularity on a pipe (e.g., see 250 and onward in FIG. 2). As the process continues, each of the windows may assume a dedicated function as follows:

i. The hue, saturation and brightness image windows (331a/b/c) may display, respectively, hue, saturation and brightness threshold images (568a, 568b and 568c, respectively) as illustrated and discussed herein with respect to FIG. 5.
  ii. The tracking window (329) may display an original image (or video still) as captured by a camera (and possibly reduced as discussed herein), augmented by thresholded and segmented hue, saturation and brightness components (e.g., via application of the OpenCV bitwise.and( ) function as discussed herein). If an irregularity (as broadly understood herein) is present, including one of a predetermined type or a range of types, it may also be depicted here. In other words, the track window (329) displays the addition of the thresholded and segmented HSV components together by using the OpenCV bitwise.and( ) function, integrated with the original Video capture frame from the camera. The tracking window (329) also, in one or more embodiments, displays and draws the irregularity (output) into the frame if the irregularity detection is concur.
  iii. The closing window (333) may display a final image representing output of morphological operations (676) as discussed herein with respect to FIG. 6.

In accordance with one or more embodiments, trackbars (also known as "sliders") may be created to functionally link with the hue, saturation and brightness windows (331a/b/c). To such an end, as illustrated by way of non-restrictive example in FIG. 4, a GUI (425) may thereby include a trackbar window (435) where trackbars (437) for minimum values of each of hue, saturation and brightness (HMIN, SMIN and VMIN) may be provided, along with trackbars (439) for maximum values of each of hue, saturation and brightness (HMAX, SMAX and VMAX). As is generally known, each trackbar may include a "button" that is configured to slide along a length of the trackbar, e.g., via cursor activation or initial placement, and values for where each slider is at can be displayed (##). Thus, initial values, or defaults, for each of each of the six (minimum or maximum) values can be established at the start but can then be adjusted (or reset) by the user. The initial/default values themselves may be suitably established or input prior to a process for automatically detecting an irregularity on a pipe and can derive from any of a variety of possible sources (e.g., prior experimental results), and may correspond to an irregularity of a predetermined type or range of types. More particularly, an irregularity or type of irregularity may be understood as corresponding to a particular color or range of colors. The trackbar window (435) may be created just after creation of the five windows shown in FIGS. 3 (329, 331a, 331b, 331c and 333), and before other steps of a general process for automatically detecting an irregularity on a pipe (e.g., see 250 and onward in FIG. 2).

In one example embodiment, to create the trackbars (437/439), the OpenCV function createTrackbar( ) may be invoked. Additionally, the OpenCV function cv2.getTrackbarPos( ) can be invoked in order to bind the trackbars (437/439) to the hue, saturation and brightness windows ((331a/b/c) in FIG. 3), and also to obtain information from the trackbars (437/439), e.g., from values set or changed on each, to be applied in forming or displaying the closing window ((333) in FIG. 3). Particularly, in using the OpenCV function cv2.getTrackbarPos( ) where the first argument can be a trackbar name, and the second argument can be the name of a window to which the trackbar name is attached or linked.

In accordance with one or more variant embodiments, the trackbars (437/439) may be included as constituent parts of the hue, saturation and brightness windows (331a/b/c) shown in FIG. 3. Thus, a hue window (331a) may include "HMIN" and "HMAX" trackbars, a saturation window (331b) may include "SMIN" AND "SMAX" windows, and a brightness window (331c) may include "VMIN" and "VMAX" trackbars. This type of integration may be brought about by using the OpenCV function, "imshow. As such, the function "imshow( )" may integrate two parameters:

window_name, a string representing the name of the window in which an image is to be displayed (e.g., the "hue", "saturation" or "brightness" window, as shown at (331a/b/c) in FIG. 3); and image, representing the image to be displayed (e.g., a corresponding split threshold frame, such as frames (568a/b/c) discussed with respect to FIG. 5, or a trackbar image).

FIG. 5 provides a flowchart depicting processes of image conversion and splitting, in accordance with one or more embodiments. As such, after an RGB image has been captured by a camera (step 201 of FIG. 2), the image may be reduced in size (542) to permit quicker processing (e.g., via a processor such as that indicated at (805) in FIG. 7). This size reduction step (542) may occur before or after the creation of windows such as those discussed with respect to FIG. 3 (e.g., windows (329), (331a/b/c) and (333)). A Raster Image Processor ("RIP") may be employed at this step to assist in the size reduction and/or facilitate image processing further downstream (e.g., as a constituent portion of the processor (805)). In one or more embodiments, the RIP processor reduces the image size for a faster processing of the images frames in the event that the processor was not fast enough to process the camera capturing. The RIP processor is applied before the irregularity detection module (115) begins its functions.

By way of an illustrative and non-restrictive example of a size reduction step (542), the OpenCV function VideoCapture(integer index) may be used to open a camera to capture a video that may be utilized as live input for a process as contemplated herein. Width and height dimensions of the video frame may then be reduced via the OpenCV function cap.set(propid,value). The functions cap.get(3,320) and cap.get(4,240) can be invoked to convert frame dimensions from a default of 640×480 to 320×240. Put another way, the "cap.set" function can be used on its own to reset the default video frame dimensions from 640×480 to 320×240, while the "cap.get" functions may be seen as optional, essentially for checking/verifying the default frame dimensions of the camera (and/or other device) that may be used in performing an algorithm as contemplated herein.

Whether or not reduced in size, the RGB image may then be converted to an HSV image (552). Accordingly, by way of a non-restrictive example, in such a conversion of an image from one color space to another, and extraction of a colored object, the OpenCV function cv2.cvtColor (frame, cv2.COLOR_BGR2HSV) can be invoked to convert from RGB to HSV as a continuous loop order. Here, cv2.cvtColor( ) is the conversion method and COLOR_BGR2HSV is the color space flag.

The HSV color space amounts to a cylindrical-coordinate representation of points in an RGB color model. As such, an HSV representation rearranges the geometry of the RGB model in an attempt to be more intuitive and perceptually relevant. The hue component H is an angular measurement, analogous to a position around a color wheel. Thus, for instance, "red" falls between 0 and 60 degrees and "yellow" falls between 61 and 120 degrees. The saturation component S quantitatively describes color intensity, and alternatively can be perceived as an amount of "grey" in a particular color, on a scale from 0 to 100 percent, where an approach toward 0 introduces more "grey", and an approach toward 100 introduces more of a primary color. The brightness (or value) component V quantitatively describes brightness on a scale from 0 to 100, where an approach toward 0 introduces more "black" (or toward a complete absence of color), and an approach toward 100 introduces more "brightness", or vibrancy of color. Graphically, S is depicted as a quantity along a "horizontal" and "radial" direction, in the plane parallel to where the angular quantity of H is considered/depicted, and V is depicted along a "vertical" axis which is perpendicular to any plane where H and S are considered/depicted.

In accordance with one or more embodiments, the HSV image (as converted from the RGB image) may be split (562) into hue (564a), saturation (564b) and brightness (564c) (H, S and V) components, respectively. Each of the components 564a/b/c represent individual image bands derived from the original HSV image, thus each are single channel images. Here, by way of a non-restrictive example, the OpenCV function cv2.split(HSV) may be invoked to "unpack" each element of the HSV frame into variables named hue,sat,val that can be utilized subsequently (e.g., during thresholding); put another way, the function returns a tuple of individual image bands from the original HSV image. Splitting an "HSV" image creates three new images each containing a copy of one of the original bands (hue, saturation, value).

In accordance with one or more embodiments, thresholding operations (566a, 566b and 566c, respectively) may then be performed on each of the components (564a/b/c), applying the minimum and maximum values for H, S and V discussed previously. The results are threshold images for hue, saturation and brightness, respectively (568a/b/c). As such, the OpenCV function inRange( ) may be applied for each of the hue, saturation and brightness windows (see 331a/b/c in FIG. 3), with corresponding H, S and V "min" and "max" trackbars (see 437/439 in FIG. 4) as inputs to that function. In accordance with a non-restrictive example, since live frames may be captured in one or more embodiments, array functions from the NumPy library can be invoked to image-process the live frames. As such, application of the OpenCV function inRange( ) then can permit detection of an object based on a range of pixel values in the HSV colorspace, and the segmenting out a particular region or color from an image, as such:

cv2.inRange(np.array(src), np.array(lowerb), np.array(upperb))

Here, src is the input image frame while lowerb and upperb represent the trackbars (discussed heretofore) that segment any color in a live webcam feed and denote (respectively) the lower and upper boundaries of a predetermined threshold region, as established by the trackbars. Thus, these lower and upper boundaries correspond to the "MIN" and "MAX" values for hue, saturation and brightness discussed heretofore (e.g., with respect to the trackbars (437) and (439) shown in FIG. 4). As each pixel of the image will have a value (corresponding to the original RGB colorspace) from 0 to 255, the inRange( ) function checks if a pixel value falls in the range between the upper and lower boundaries ("MIN" and "MAX"), inclusive of the boundary values themselves. If a pixel passes this test, it is assigned a value of "255" for a binary image and thereby turned white, otherwise it is assigned a value of "0" and turned black. The pixels so calculated then result in a thresholded image for each of hue, saturation and brightness (568a/b/c).

FIG. 6 provides a flowchart depicting processes of generating a binary image and performing feature extraction on a binary image, in accordance with one or more embodiments. As shown, hue, saturation and brightness threshold images (668) may be used in forming (672) a binary image (674). Morphological operations (676), including noise reduction, may then be performed on the binary image. Such operations (676) may include, but by no means need to be limited to, dilation, erosion and/or Gaussian filtering. A Hough Line Transformation (682), such as a probabilistic Hough Line Transformation, may then performed. The output showing an irregularity (684), e.g., a "closing window" (see 333 in FIG. 3), may then result.

As such, in accordance with one or more embodiments, the binary image (674) may be formed (672) such that a pixel is set to "1" if determined to be a candidate for corresponding to an irregularity (e.g., a detected spot or irregularity), or is set to "0" if determined not to be a candidate for corresponding to an irregularity, as touched on heretofore. Put another way, "1" may correspond to a pixel which contains a valid color that could belong to a detected irregularity, and "0" may correspond to a pixel that is "invalid", i.e., does not contain a valid color that could belong to the detected spot. As such, the binary image (674) created here is essentially a combination of the thresholded hue, saturation and brightness images (668) which were created via thresholding operations as discussed heretofore, and where pixels were retained in correspondence with satisfying the input (minimum and maximum) threshold values in each case. In this connection, the thresholded and segmented HSV components can be integrated and added together through the OpenCV bitwise.and( ) function, to then yield a final binary image (674) in preparation for morphological filtering operations. As such, in one or more embodiments, this step of integrating and adding together can involve returning a pixel set to "1" if the same pixel was successfully thresholded to appear in each of the hue, saturation and brightness threshold images (668).

Essentially, in accordance with one or more embodiments, each pixel on the binary image (674) can be understood as mapping one-to-one to pixels in the original (possibly size-reduced) RGB image captured by a camera or other instrument (as described/illustrated herein, e.g., with respect to FIG. 1). Further, the binary image (674) may appear in its own dedicated window or, alternatively, may be added (or superimposed) on the original RGB image to form the "tracking" image discussed herein (e.g., as may appear in tracking window (329) in FIG. 3).

In accordance with one or more embodiments, morphological operations (676) can be performed to remove noise from the binary image (674). This step can be initiated via invoking the OpenCV dilate( ) function and providing the aforementioned "Tracking" as input. In the output of this dilation operation, the "white region" in the image is increased, or the size of a foreground object (e.g., an irregularity as discussed herein) increases; such output may be termed "Dilation". Then, the OpenCV function morphologyEx( ) can be invoked to apply a closing operation, which applies "Dilation" as input along with the OpenCV function MORPH_CLOSE, followed by an erosion function. As such, the closing operation can be useful in closing small holes inside foreground objects, or small black points on the object. The output of this operation may be termed "Closing" and may be represented by the closing window (333) discussed heretofore with regard to FIG. 3.

By way of clarification, in accordance with one or more embodiments, dilation and erosion in image processing are generally understood as opposites of one another. As such, dilation here increases the size of a foreground object, while a "white region" corresponds to extraneous areas disposed about the foreground object and itself also increases. Erosion, on the other hand, operates to remove (visual) white noise in an image, and (visually) shrink the foreground. The end result here, indeed, is to eliminate small white "holes" inside of the foreground object as well as extraneous single black points about or near the foreground object.

In accordance with one or more embodiments, morphological operations (676) can include Gaussian filtering. To this end, the OpenCV GaussianBlur( ) function can be invoked, as it is highly effective in removing Gaussian noise from the binary image and smoothing the frames thereof. Here, "Closing" can be provided as an input, while the output can also be termed "Closing" and can be regarded as a final output result of the morphological operations (676).

In accordance with one or more embodiments, a final image processing operation or step may include a Hough Line Transformation (682), which is configured to find or discern line segments and thereby detect an irregularity. As a refinement of a Hough Line Transformation, a probabilistic Hough Line Transformation may particularly be employed as it is an even more efficient process which can still yield favorable results. Particularly, a probabilistic Hough Line Transformation only takes into consideration a random subset of points that are sufficient for line detection. Put another way, a probabilistic Hough transform is more efficient in the event that an image contains a few longer linear segments; it returns line segments as output, rather than an entire line. Each segment is represented by starting and ending points. Thus, as broadly applied and understood herein, line segments may be found in the binary image (674) using a probabilistic Hough transform. The number of lines detected may vary while thresholds (as understood herein) are changed. If more restrictive thresholding is applied, then fewer lines will be detected as more points will be needed to "declare" that a line is detected.

As such, in accordance with one or more embodiments, the output of step (682) can include extreme points of lines which are detected. The OpenCV library function HoughLinesP( ) may be invoked here as a probabilistic Hough Line Transformation, and results in running the actual detection of the spot in the windows synchronized with trackbars mentioned earlier for changing the threshold values.

As an example, a HoughLinesP( ) function may be expressed as follows:

HoughLinesP(closing, rho, theta, threshold, minLinLength, maxLineGap)

Here, closing represents a vector that which stores the parameters of the detection, rho is the resolution of the parameter, and theta is the resolution of the parameter in radians. Additionally, threshold is the minimum number of intersections to detect, minLinLength is the minimum number of points that can form a line or spot detection (e.g., lines with less than this number of points can be disregarded), and maxLineGap is the maximum gap between two points to be considered in the same line.

In accordance with one or more embodiments, the result of the above can then be displayed by depicting the region of the irregularity (as detected) in a tracking window (see 329 in FIG. 3). This, itself, can be undertaken (by way of non-restrictive example) via invoking the following OpenCV function, with inputs then applied as noted:

cv2.line(img, pt1, pt2, color, thickness, lineType, shift)

The result is displayed by drawing into the tracking window (329) an irregularity that has been detected. Thus, in applying such drawing via the above-noted function: img represents the input image; pt1 and pt2, respectively, are first and second points of the line segment, color and thickness relate to the color and thickness of the line segment, lineType represents the type of line (as understood in the context of OpenCV), and shift represents a shift of decimal places in point coordinates.

Experimentation has aptly demonstrated the effectiveness of a process as broadly contemplated herein. As such, 1200 experiments were conducted with three different configurations, each configuration including 400 experiments. The results showed 100% accuracy by way of detecting a red line spot that was added artificially about an external surface of a pipe. (While a red spot color was selected arbitrarily, any color may be applicable for being detected by a process as broadly contemplated herein.) A tracking image did end up including a visualization of the existence (and relative location) of the red spot disposed about the pipe.

It can be appreciated from the foregoing that, in accordance with one or more embodiments, the detection of an irregularity on a pipe may be based on the color of the irregularity. Particularly, it should be understood that colors associated with various types of irregularities can be pre-identified and known. As such, an HSV color model (as employed herein) serves to separate lama, or image intensity, from chroma, or color information. At early steps of a process for detecting an irregularity, default and/or unique colors can be input for being detected (e.g., via providing experimental HSV minimum and maximum values). It is also possible to adjust and change the default values when the process is executed. In other words, in one or more embodiments, the initial defaults are setup at the beginning of the irregularity detection module (115) before running the algorithm for selecting the desired spot color. The initial defaults are adjustable if needed while the algorithm is executing for another desired spot color.

It can further be appreciated from the foregoing that, in accordance with one or more embodiments, a process as broadly contemplated herein can be configured to "zero in" on a desired irregularity, or type of irregularity, that a user may wish to detect in particular. Thus, the initial minimum and maximum trackbar values (e.g., as set on trackbars (437) and (439) in FIG. 4) may indeed derive from previous experimental results which link a particular color, or range of colors, to a particular irregularity, or type or even range of irregularities. The initial minimum and maximum trackbar values could, in the process, be set over as broad or as narrow a range as may be desired in order to "zero in" on the desired irregularity, type or irregularity or range of irregularities. If such an initial setting of trackbar values does not follow easily merely from experimental results, the user could reset the initial values before an irregularity detection process (as broadly described/contemplated herein) begins in earnest. Alternatively, the user could set the initial values outright based on general knowledge.

Figure 4:
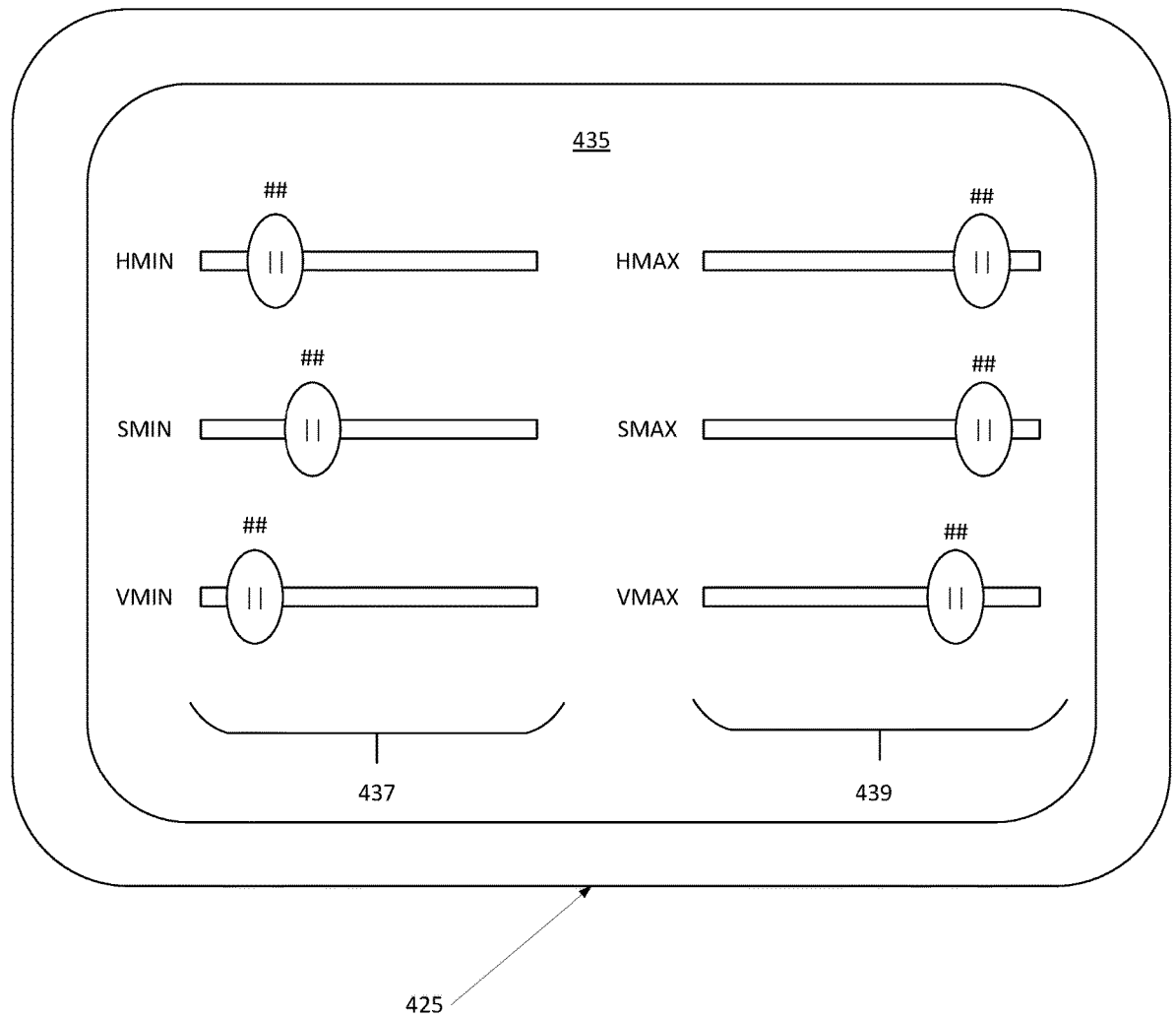
FIG. 4 schematically illustrates a GUI with a tracking bar window, in accordance with one or more embodiments.

It should also be further appreciated from the foregoing that, as noted heretofore in accordance with one or more embodiments, that the user may reset the minimum and maximum trackbar values (e.g., at (437) and (439) in FIG. 4) "on the fly" to hone in more effectively on a desired irregularity, type or irregularity or range of irregularities. In a similar vein, the process may initiate with minimum/maximum values set over a broad range, to capture more of a "generic" irregularity or type or irregularity, whence the user may then update the values via trackbars to focus in more narrowly toward a prospective (or desired) irregularity, type of irregularity or range of irregularities. As another viable alternative, a user may easily switch "on the fly", via manipulation of the noted trackbars, from focusing in on one type of irregularity toward focusing in on another type of irregularity. By way of non-restrictive example, in accordance with any type of iterative process where user intervention may result in changes to trackbar values, the OpenCV function cv2.getTrackbarPos( ) as mentioned herein, may be utilized in order to obtain such input from the trackbars.

By way of further technical clarification and recapitulation, in accordance with one or more embodiments broadly contemplated herein, it should be appreciated that "BGR to HSV", or "BGR2HSV" method may be employed in transforming an image (e.g., as indicated at (250) in FIG. 2). As such, a BGR2HSV transformation method takes a matrix in the native RGB order and converts it to its HSV equivalent. This is distinct from a "standard" conversion of the type "RGB2HSV", that would require the input matrix to be fed in in reverse order. For example, a process of (R, G, B)→(255, 0, 0), as employed in "RGB2HSV" would need to be stored as (0, 0, 255). However, when a conversion of the type "BGR2HSV" is employed, then the RGB values can be stored in a more "typical" manner of (255, 0, 0) manner.

FIG. 7 shows structural components of a system for automatically detecting an irregularity on a pipe, in accordance with one or more embodiments. An image of a region of a pipe (711), which may include an irregularity (714) thereupon, may be captured by a camera (701) arranged at an external surface of the pipe. The image may be transmitted directly or indirectly to a computer (802) for processing. For instance, the image may be transmitted to, or stored at, a local device such as a laptop or other portable computer, to then be relayed or copied to the computer (802) for processing. Thus, in one implementation, the image may be stored on such a local device on non-transitory computer memory. Non-transitory computer memory may be embodied by one or more computer hard-drives, or one or more computer memory tapes, or any other convenient computer memory media familiar to one skilled in the art. Alternatively, the image may be initially stored in non-transitory memory in the camera (701) itself.

The image may then be transmitted to computer (802) for processing. The computer (802) may be located at or near the location of image capture, or may be located at a remote location, that may be in another city, country, or continent. Transmission of the image to computer (802) may occur over a network (830) that may be a local area network using an ethernet or Wi-Fi system, or alternatively the network (830) may be a wide area network using an internet or intranet service. Alternatively, the image may be transmitted over a network (830) using satellite communication networks.

FIG. 7 further depicts a block diagram of a computer system (802) used to provide computational functionalities associated with described algorithms, methods, functions, processes, flows, and procedures as described in this disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802)) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 7, two or more interfaces (804) may be used according to particular needs, desires, or particular implementations of the computer (802). The interface (804) is used by the computer (802) for communicating with other systems in a distributed environment that are connected to the network (830). Generally, the interface (804 includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). For example, memory (806) can be a database storing data consistent with this disclosure. Although illustrated as a single memory (806) in FIG. 7, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A system for automatically detecting an irregularity on a pipe, the system comprising:
   a camera arranged at an external surface of the pipe, the camera being configured to capture a Red, Green and Blue (RBG) image of a region of a pipe; and one or more hardware processors in communication with the camera and configured to:
   convert the RGB image to a modified image;
   split the modified image into a plurality of components;
   generate a binary image via performing a thresholding operation which utilizes the plurality of components; and
   detect the irregularity on the pipe via performing a feature extraction process on the binary image.

2. The system according to claim 1, wherein:
   the modified image is a Hue, Saturation and Brightness (HSV) image, and
   the HSV image is split into a hue component, a saturation component, and a brightness component.

3. The system according to claim 2, wherein the thresholding operation is performed on each of the hue, saturation and brightness components.

4. The system according to claim 3, wherein:
   the one or more hardware processors are configured to input minimum and maximum values for hue, saturation and brightness, and
   the thresholding operation is performed via applying the minimum and maximum values for hue, saturation and brightness, respectively, to the hue, saturation and brightness components.

5. The system according to claim 4, wherein the one or more hardware processors are configured to display a plurality of tracking bars at a graphical user interface, the tracking bars corresponding to the minimum and maximum values for hue, saturation and brightness.

6. The system according to claim 5, wherein the tracking bars are adjustable to reset minimum and maximum values for hue, saturation and brightness.

7. The system according to claim 1, wherein the binary image is generated to include a plurality of pixels wherein, based on the thresholding operation:
   a pixel is set to "1" if determined to be a candidate for corresponding to an irregularity; and
   a pixel is set to "0" if determined not to be a candidate for corresponding to an irregularity.

8. The system according to claim 1, wherein the one or more hardware processors are configured to remove noise from the binary image, via performing morphological operations on the binary image.

9. The system according to claim 8, wherein the morphological operations include at least one selected from a group consisting of: a dilation operation, an erosion operation and a Gaussian filtering operation.

10. The system according to claim 1, wherein the feature extraction process comprises a Hough Line Transformation operation performed on the binary image.

11. The system according to claim 10, wherein the Hough Line Transformation operation is a probabilistic Hough Line transformation operation.

12. The system according to claim 1, wherein the one or more hardware processors are configured to reduce the RGB image in size before the conversion of the RGB image to the modified image.

13. A method comprising:
   receiving, via a computer processor, a Red, Green and Blue (RGB) image of a region of a pipe; and
   converting, via the computer processor, the RGB image to a modified image;
   splitting, via the computer processor, the modified image into a plurality of components;
   generating, via the computer processor, a binary image via performing a thresholding operation which utilizes the plurality of components; and
   detecting, via the computer processor, an irregularity on the pipe via performing a feature extraction process on the binary image.

14. The method according to claim 13, wherein:
   the modified image is a Hue, Saturation and Brightness (HSV) image,
   the HSV image is split into a hue component, a saturation component, and a brightness component, and
   the thresholding operation is performed on each of the hue, saturation and brightness components.

15. The method according to claim 14, wherein:
the one or more hardware processors are configured to input minimum and maximum values for hue, saturation and brightness, and
the thresholding operation is performed via applying the minimum and maximum values for hue, saturation and brightness, respectively, to the hue, saturation and brightness components.

16. The method according to claim 15, wherein:
the one or more hardware processors are configured to display a plurality of tracking bars at a graphical user interface, the tracking bars corresponding to the minimum and maximum values for hue, saturation and brightness; and
the tracking bars are adjustable to reset minimum and maximum values for hue, saturation and brightness.

17. The method according to claim 13, wherein the binary image is generated to include a plurality of pixels wherein, based on the thresholding operation:
a pixel is set to "1" if determined to be a candidate for corresponding to an irregularity; and
a pixel is set to "0" if determined not to be a candidate for corresponding to an irregularity.

18. The method according to claim 13, wherein the one or more hardware processors are configured to remove noise from the binary image, via performing morphological operations on the binary image.

19. The method according to claim 14, wherein the feature extraction process comprises a Hough Line Transformation operation performed on the binary image.

20. A non-transitory computer readable medium storing instructions executable by a computer processor, the instructions comprising functionality for:
receiving an RGB ("Red, Green and Blue") image of a region of a pipe, at an external surface of the pipe;
converting, via a computer processor, the RGB image to a modified image;
splitting, via the computer processor, the modified image into a plurality of components;
generating, via the computer processor, a binary image via performing a thresholding operation which utilizes the plurality of components; and
detecting, via the computer processor, the irregularity on the pipe via performing a feature extraction process on the binary image.

* * * * *